(12) United States Patent
Powell

(10) Patent No.: US 6,427,975 B1
(45) Date of Patent: Aug. 6, 2002

(54) THROTTLE BODY INSERT FOR INTAKE MANIFOLD

(75) Inventor: Jeffrey Powell, Belle River (CA)

(73) Assignee: Siemens VDO Automotive Inc., Windsor ( * ) Notice: Subject to any disclaimer, the term of this patent is extended or adjusted under 35 U.S.C. 154(b) by 0 days.

(21) Appl. No.: 09/656,731

(22) Filed: Sep. 7, 2000

Related U.S. Application Data

(60) Provisional application No. 60/152,794, filed on Sep. 8, 1999.

(51) Int. Cl.[7] ............................... F16K 1/22; F16K 5/00
(52) U.S. Cl. ......................................... 251/305; 251/314
(58) Field of Search ................................. 251/305, 314, 251/306

(56) References Cited

U.S. PATENT DOCUMENTS

| | | | |
|---|---|---|---|
| 5,035,214 A | | 7/1991 | Daly et al. |
| 5,797,589 A | | 8/1998 | Kalebjian et al. |
| 5,979,871 A | * | 11/1999 | Forbes et al. ............... 123/337 |

FOREIGN PATENT DOCUMENTS

| | | |
|---|---|---|
| DE | 4202437 A1 | 7/1992 |
| DE | 4329522 A1 | 3/1995 |
| GB | 2067719 A | 7/1981 |

OTHER PUBLICATIONS

European Search Report for Application No. 00 11 9111.
European Search Report for Application No. 00 11 9109.

* cited by examiner

*Primary Examiner*—Lesley D. Morris
*Assistant Examiner*—David A Bonderer

(57) ABSTRACT

The present invention provides a throttle body assembly for an internal combustion engine. The assembly includes an insert having an opening and opposing bores arranged transverse to the opening. The insert is constructed of a first material, preferably a metal such as aluminum or magnesium. A throttle shaft is supported by the bores and spans the opening. A throttle blade is disposed within the opening and secured to the shaft. Both the throttle blade and throttle shaft are preferably constructed from a metal so that the seal between the throttle blade and the insert remains dimensionally stable. A body defines an air passageway with the insert at least partially disposed within the body and aligned with the air passageway. The body is constructed from a second material different from the first material, such as a composite plastic. The body may be a portion of an intake manifold. Accordingly, the above invention provides a lighter, less expensive throttle body that provides an adequate seal between the throttle blade and the air passageway so that a metal throttle body is no longer required.

10 Claims, 2 Drawing Sheets

THROTTLE BODY INSERT FOR INTAKE MANIFOLD

RELATED APPLICATIONS

This application claims priority to provisional application serial No. 60/152,794 filed on Sep. 8, 1999.

BACKGROUND OF THE INVENTION

This invention relates to throttle body for an internal combustion engine, and more specifically, the invention relates to a throttle body suitable for integration with a plastic component of an air induction system.

A throttle body regulates the flow of air from the atmosphere to an intake manifold that provides an air/fuel mixture to engine combustion chambers. Providing maximum airflow to the combustion chamber enables the engine to reach maximum power. The engine produces a minimum amount of power when airflow is almost entirely restricted, such as when the engine is idling. Of course, airflow must be regulated by the throttle body between maximum and minimum engine power so that the engine may perform under a variety of vehicle operating conditions.

The throttle body includes a throttle blade that is secured to a throttle shaft which is pivotally supported in a throttle body. The throttle blade is situated in an air passageway that carries fresh air to the intake manifold. The throttle shaft is rotated by a cable, solenoid, or other actuator to rotate the throttle blade between a variety of positions to regulate the flow of air to the manifold. The throttle blade and air passageway must mate or seal to prevent leakage when the throttle is closed and provide consistent air flow at a given throttle blade position during various operating conditions. Typically, the throttle body is constructed from aluminum or magnesium and is secured to an aluminum or magnesium intake manifold by threaded fasteners. Recently, plastic throttle bodies have been used in air induction system designs to reduce the weight and cost of the engine. However, the automotive industry has not widely accepted plastic throttle bodies because of concerns that the throttle bodies are not robust enough. Specifically, a throttle body is subjected to heat fluctuations that may significantly impact the dimensional stability of the throttle body and permit warping. As a result, an unacceptable amount of leakage could occur between the throttle blade and air passageway. Therefore, what is needed is a lighter, less expensive throttle body that provides an adequate seal between the throttle blade and the air passageway. Specifically, a throttle body is subjected to heat fluctuations that may significantly impact the dimensional stability of the throttle body and permit warping. As a result, an unacceptable amount of leakage could occur between the throttle blade and air passageway. Therefore, what is needed is a lighter, less expensive throttle body that provides an adequate seal between the throttle blade and the air passageway.

SUMMARY OF THE INVENTION AND ADVANTAGES

The present invention provides a throttle body assembly for an internal combustion engine. The assembly includes an insert having an opening and opposing bores arranged transverse to the opening. The insert is constructed of a first material, preferably a metal such as aluminum or magnesium. A throttle shaft is supported by the bores and spans the opening. A throttle blade is disposed within the opening and secured to the shaft. Both the throttle blade and throttle shaft are preferably constructed from a metal so that the seal between the throttle blade and the insert remains dimensionally stable. A body defines an air passageway with the insert at least partially disposed within the body and aligned with the air passageway. The body is constructed from a second material different from the first material, such as a composite plastic. The body may be a portion of an intake manifold. Accordingly, the above invention provides a lighter, less expensive throttle body that provides an adequate seal between the throttle blade and the air passageway so that a metal throttle body is no longer required.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
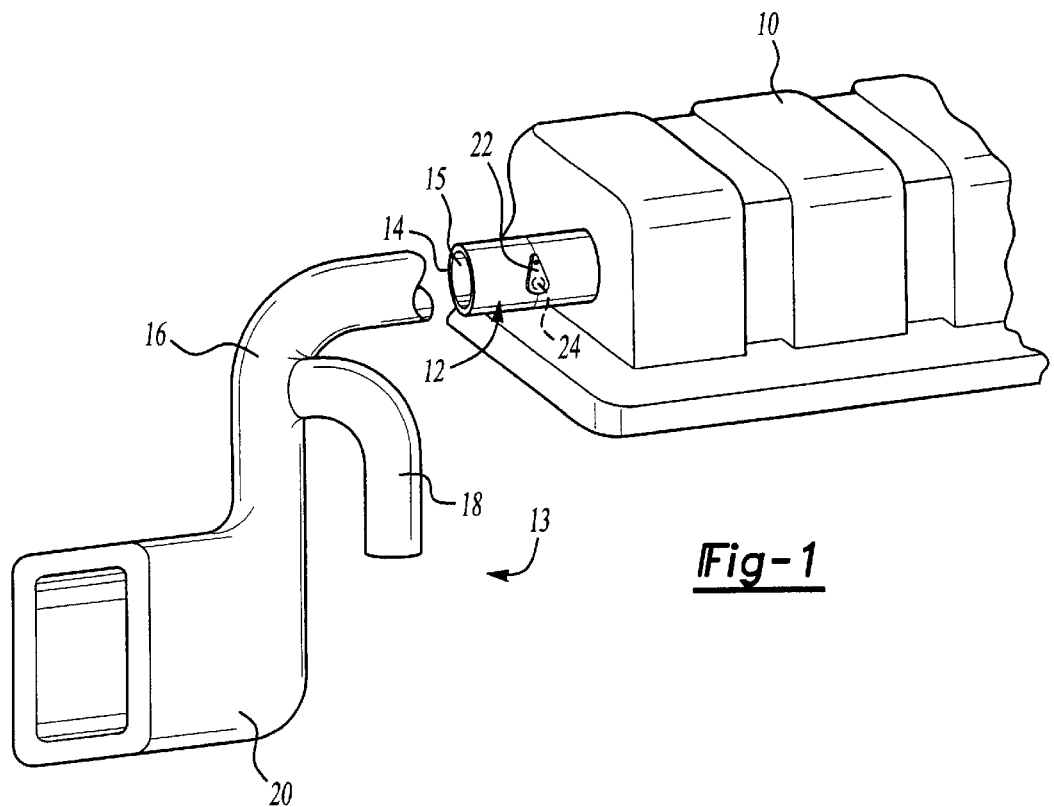
FIG. 1 is a perspective view of a throttle body assembly and intake manifold.
Figure 2:
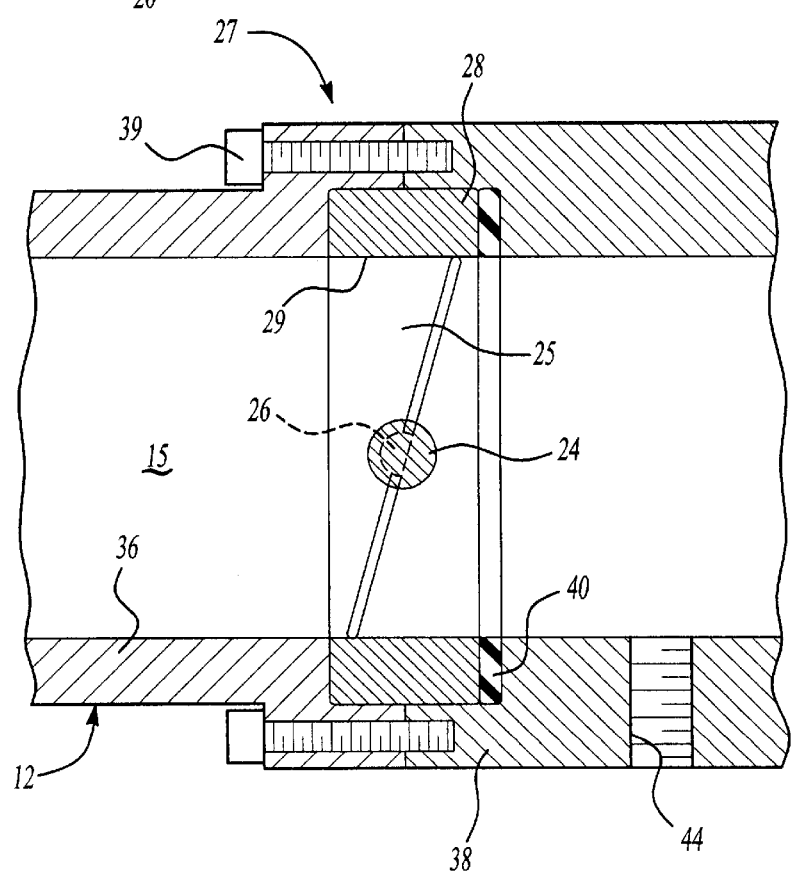
FIG. 2 is a cross-sectional view of the throttle body of the present invention.
Figure 3:
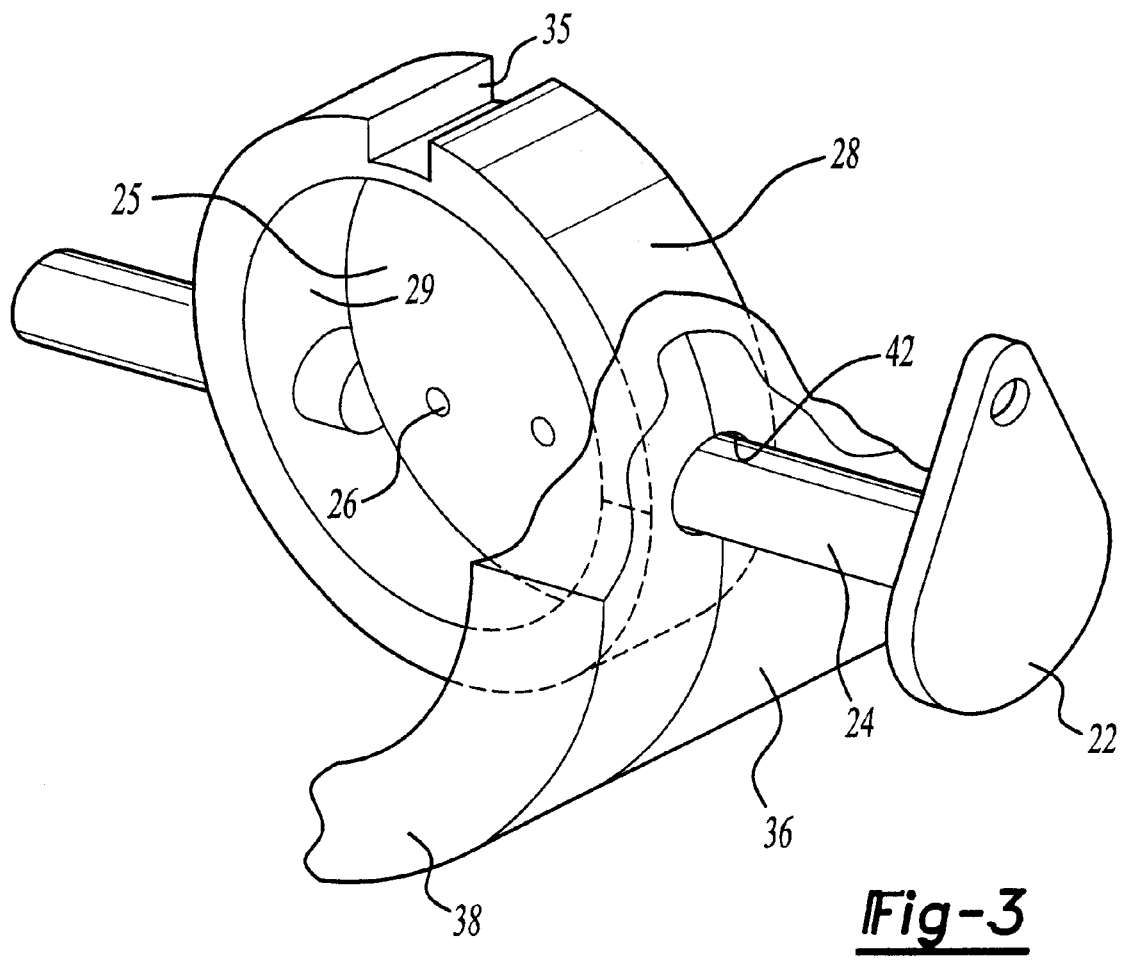
FIG. 3 is a perspective view of the throttle body assembly of the present invention.

FIG. 1 illustrates an intake manifold 10 which is preferably constructed from a plastic composite. A throttle body assembly 12 regulates the flow of air from the intake assembly 13 into the intake manifold 10. Atmospheric air flows through the air filter 20 through the air intake hose or zip tube 16 into the inlet 14 of the throttle body assembly 12. The intake assembly 13 may also include a resonator 18 to reduce noise in the induction system. An air passageway 15 flows from the inlet 14 through the throttle body assembly 12 into the intake manifold 10 to carry the atmospheric air to the engine combustion chambers. Airflow is regulated through the throttle body assembly 12 by manipulating a cam 22 with the actuation of a cable, solenoid, or other actuator. The cam 22 rotates a shaft 24 to throttle the air, which is best seen in FIGS. 2 and 3.

The throttle body assembly 12 of the present invention includes an insert 28 that defines an opening 29. The insert 28 is preferably constructed from a material that is dimensionally stable under changing temperatures and conditions such as a metal like aluminum or magnesium. It is to be understood, however, that other materials may be used. The insert 28 includes opposing bores that support the throttle shaft 20 for rotation. A throttle blade 25 is secured to the throttle shaft 24 by fasteners 26. The perimeter of the throttle blade 25 seals about the opening 29 of the insert 28 when the throttle is in the closed position, as shown in FIG. 2. The throttle blade 25 is also preferably constructed from a metal so that the coefficients of expansion of the insert 28 and the throttle blade 25 are similar.

The insert 28 is received within a body 27, which defines the air passageway 15. The body 27 may be a portion of the intake manifold 10 or any other portion of the air induction system. The body 27 includes a hole or aperture 42 to permit the throttle shaft 24 from the body 27. The body 27 may be assembled about the insert 28 in any number of ways. For example, the body 27 may include a first portion 36 and a second portion 38 that are secured to one another by fasteners 39. In this case, seal 40 may be used between the insert 28 and a portion of the body 27 to securely seal the insert 28 within the body 27. Alternatively, the first and second portions 36, 38 may be welded together about the insert 28 such as by vibration, orbital, or spin welding. The first and second portions 36, 38 may also be snap-fit about the insert 28. The body 27 may also be molded about the insert 28 in one piece. Preferably, the insert 28 includes a locating feature 35 that is received by a complimentary locating feature (not shown) in the body 27.

The body 27 may include any number of accessory apertures 44 for receiving control devices such as an idle air control motor, throttle position sensor, canister purge solenoid, PVC port, purge port, accessory vacuum ports, brake boost signal port, MAP sensor bore, or bearing bores. In this manner, the throttle body assembly of the present invention may be used with a less dimensionally stable material which is more desirable from a cost and weight standpoint such as a composite plastic.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A throttle body assembly for an internal combustion engine comprising:

an insert including an opening and opposing bores arranged transverse to said opening, said insert constructed from a metal;

a throttle shaft supported by said bores and spanning said opening;

a throttle blade disposed within said opening and secured to said shaft, said throttle blade blocking said opening in a closed position with said insert having a portion surrounding said throttle blade in said closed portion; and a body including an internal combustion engine intake manifold portion and a second portion defining an air passageway secured to one another about said insert substantially enclosing said portion of said insert with said opening aligned with said air passageway, said body constructed from a composite plastic.

2. The assembly according to claim 1, wherein said metal is aluminum.

3. The assembly according to claim 1, wherein said metal is magnesium.

4. The assembly according to claim 1, wherein said insert includes a generally cylindrical outer surface.

5. The assembly according to claim 1, wherein said second material is a composite plastic.

6. The assembly according to claim 1, wherein said throttle blade blocks said opening in a closed position with said insert having a portion surrounding said throttle blade in said closed portion, said body portions substantially enclosing said portion of said insert.

7. The assembly according to claim 6, wherein threaded fasteners secure said first and second portions to one another.

8. The assembly according to claim 6, wherein said second portion includes a portion of an air intake hose.

9. The assembly according to claim 1, further including a seal interposed between said insert and said body.

10. The assembly according to claim 9, wherein said seal is a rubber ring abutting a surface of said insert.

* * * * *